US010078892B1

(12) United States Patent
Wang et al.

(10) Patent No.: US 10,078,892 B1
(45) Date of Patent: Sep. 18, 2018

(54) METHODS AND SYSTEMS FOR VEHICLE TIRE ANALYSIS USING VEHICLE MOUNTED CAMERAS

(71) Applicant: GM GLOBAL TECHNOLOGY OPERATIONS LLC, Detroit, MI (US)

(72) Inventors: Jinsong Wang, Troy, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/461,269

(22) Filed: Mar. 16, 2017

(51) Int. Cl.
G06T 7/00 (2017.01)
B60C 11/24 (2006.01)
G01M 17/02 (2006.01)

(52) U.S. Cl.
CPC ............ G06T 7/001 (2013.01); B60C 11/246 (2013.01); G01M 17/027 (2013.01); *G06T 2207/10016* (2013.01); *G06T 2207/20081* (2013.01); *G06T 2207/20084* (2013.01); *G06T 2207/30108* (2013.01); *G06T 2207/30242* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,577,532 B2 | 8/2009 | Ichikawa et al. | |
| 9,764,603 B2 * | 9/2017 | Lehmann | B60C 11/243 |
| 2011/0221587 A1 * | 9/2011 | Katou | B60C 23/0408 340/443 |
| 2012/0020526 A1 * | 1/2012 | Teti | G06T 7/0004 382/104 |
| 2016/0101734 A1 * | 4/2016 | Baek | B60R 1/00 348/148 |
| 2016/0127625 A1 * | 5/2016 | Hanel | G06K 9/209 348/148 |
| 2017/0161572 A1 * | 6/2017 | Zhao | B60W 40/06 |

OTHER PUBLICATIONS

Johnson, Brent D., "Thermal Imaging for Tire Wear Detection", Radian Inc., Photonics Spectra, Aug. 2001.
"Examining Tesla Model S Excessive Rear Tire Wear via Thermal Camera—Video," accessed on Mar. 14, 2017 from http://insideevs.com/examining-tesla-model-s-excessive-rear-tire-wear-via-thermal-camera-video/.pdf.
"Continental In-Tire Sensors Read Tread Depth—Future tire pressure sensors read pressure, load and tread depth," accessed on Mar. 14, 2017 from http://www.prnewswire.com/news-releases/continental-in-tire-sensors-read-tread-depth-258465021.html.

* cited by examiner

Primary Examiner — Delomia L Gilliard
(74) Attorney, Agent, or Firm — Lorenz & Kopf, LLP

(57) ABSTRACT

Methods and systems are provided for analyzing tires of a vehicle utilizing camera images from one or more cameras mounted on the vehicle (or infrastructure). In one example, the method includes obtaining camera images of one or more tires of a vehicle, utilizing one or more cameras that are mounted on the vehicle, during operation of the vehicle; and processing the camera images, via a processor, in order to generate an analysis of one or more of the tires based on the images that were obtained via the one or more cameras that are mounted on the vehicle.

18 Claims, 5 Drawing Sheets

METHODS AND SYSTEMS FOR VEHICLE TIRE ANALYSIS USING VEHICLE MOUNTED CAMERAS

TECHNICAL FIELD

The technical field generally relates to the field of vehicles and, more specifically, to methods and systems for analyzing tires of vehicles using information obtained from cameras mounted on the vehicles.

BACKGROUND

Tire wear and health can be an important consideration for vehicles, such as automobiles. However, it may be difficult to analyze wear and health of tires in certain situations, for example in an automated manner and/or while the vehicle is being operated.

Accordingly, it is desirable to provide improved methods and systems for analyzing tires of vehicles. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a first method is provided. The method includes obtaining camera images of one or more tires of a vehicle, utilizing one or more cameras that are mounted on the vehicle, during operation of the vehicle; and processing the camera images, via a processor, in order to generate an analysis of one or more of the tires based on the images that were obtained via the one or more cameras that are mounted on the vehicle.

In accordance with another exemplary embodiment, a second method is provided. The method includes obtaining camera images of tracks made by one or more tires of a vehicle, utilizing one or more cameras that are mounted on the vehicle, during operation of the vehicle; and processing the camera images, via a processor, in order to generate an analysis of one or more of the tires based on the images that were obtained via the one or more cameras that are mounted on the vehicle.

In accordance with a further exemplary embodiment, a vehicle is provided. The vehicle includes one or more tires, one or more cameras, and a processor. The one or more cameras are mounted on the vehicle, and are configured to generate camera images of tracks made by one or more of the tires. The processor is configured to process the camera images, in order to generate an analysis of one or more of the tires based on the images that were obtained via the one or more cameras that are mounted on the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
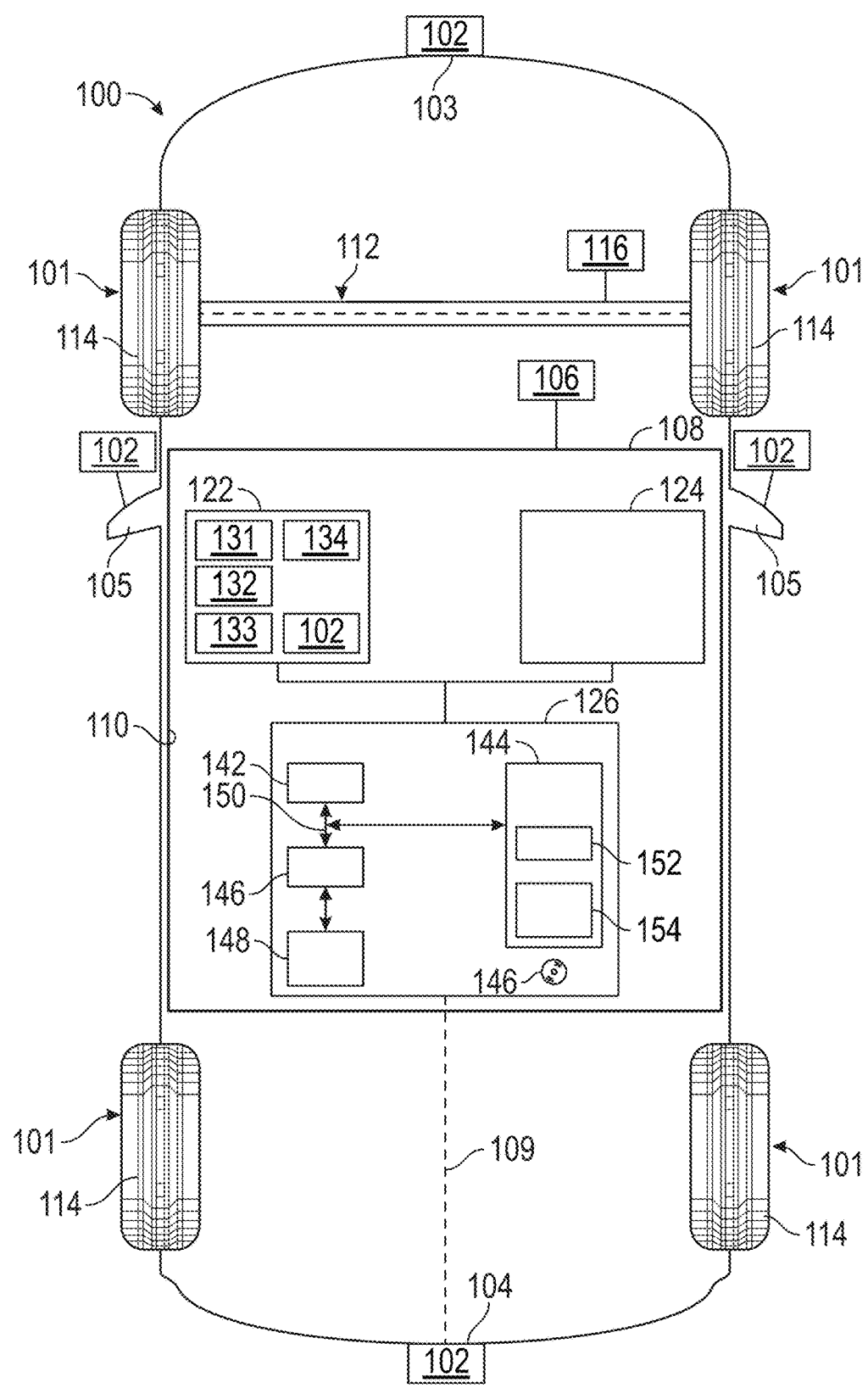
FIG. 1 is a functional block diagram of a vehicle that includes a plurality of tires, a plurality of cameras, and a control system for analyzing the tires using images obtained from the cameras.

FIG. 1 illustrates a vehicle 100, according to an exemplary embodiment. As described in greater detail further below, the vehicle 100 includes wheels 101 having tires 114 and a control system 108. Also in the depicted embodiment, the vehicle 100 has one or more cameras In various embodiments, the cameras 102 provide images of the tires 114 and/or tracks made by the tires 114, and the control system 108 analyzes the tires 114 based on the images from the cameras 102 during operation of the vehicle 100, for example as discussed further below in connection with FIG. 1 as well as FIGS. 2-5.

In certain embodiments, the cameras 102 are mounted on the vehicle 100. In various embodiments, the cameras 102 are not necessarily installed as dedicated cameras 102 solely for the tire monitoring/analyzing purposes. In various embodiments, the cameras 102 include surround-view cameras for generating birdeye view for driver assistance. In various embodiments, the vehicle 100 utilizes such existing cameras 102 to explore new applications/functions, such as the tire analysis of the present Application, and can enhance the surround-view system capability/features without involving addition hardware cost. In various embodiments, the cameras 102 are mounted on one or more locations of the vehicle 100 that provide a view of one or more tires 114 and/or of tracks made by the tires 114, in order to detect tire wear. In certain other embodiments, the cameras 102 may be mounted on infrastructure of a roadway and/or one or more other locations (e.g., on a guard rail of a road, at a carwash, and so on).

In various embodiments, the vehicle 100 comprises an automobile. The vehicle 100 may be any one of a number of different types of automobiles, such as, for example, a sedan, a wagon, a truck, or a sport utility vehicle (SUV), and may be two-tire drive (2WD) (i.e., rear-tire drive or front-tire drive), four-tire drive (4WD) or all-tire drive (AWD), and/or various other types of vehicles in certain embodiments. In certain embodiments, the vehicle 100 may also comprise a motorcycle or other vehicle, or other system having a camera image with a fixed referenced point.

The vehicle 100 includes a body 110 that is arranged on a chassis 112. The body 110 substantially encloses other components of the vehicle 100. The body 110 and the chassis 112 may jointly form a frame. The vehicle 100 also includes a plurality of tires 114. The tires 114 are each rotationally coupled to the chassis 112 near a respective corner of the body 110 to facilitate movement of the vehicle 100. In one embodiment, the vehicle 100 includes four tires 114, although this may vary in other embodiments (for example for trucks and certain other vehicles).

A drive system 116 is mounted on the chassis 112, and drives the wheels 101 (including the tires 114). The drive system 116 preferably comprises a propulsion system. In certain exemplary embodiments, the drive system 116 comprises an internal combustion engine and/or an electric motor/generator, coupled with a transmission thereof. In certain embodiments, the drive system 116 may vary, and/or two or more drive systems 116 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As depicted in FIG. 1, in various embodiments, the cameras 102 are mounted on a body 110 of the vehicle 100. In the depicted embodiment, separate cameras 102 are mounted on a front portion 103 of the body 110 (e.g., a front fascia of the vehicle 100), a rear portion 104 of the body 110 (e.g., a rear fascia of the vehicle 100), and on side mirrors 105 of the vehicle 100. It will be appreciated that in various embodiments other cameras 102 may also be mounted elsewhere on the body 110 of the vehicle 100.

In various embodiments, the cameras 102 are not necessarily installed as dedicated cameras 102 solely for the tire monitoring/analyzing purposes. In various embodiments, the cameras 102 include surround-view cameras for generating birdeye view for driver assistance. In various embodiments, the vehicle 100 utilizes such existing cameras 102 to explore new applications/functions, such as the tire analysis of the present Application, and can enhance the surround-view system capability/features without involving addition hardware cost. In various embodiments, the cameras 102 are mounted on one or more locations of the vehicle 100 that provide a view of one or more tires 114 and/or of tracks made by the tires 114, in order to detect tire wear.

As noted above, in various embodiments, the cameras 102 provide images of the tires 114 and/or tracks made by the tires 114. In certain embodiments, similar to the discussion above, the cameras 102 are also installed for one or more other purposes (such as providing a surround view for the vehicle 100), and the cameras 102 are also utilized for analysis of the tires 114 as an extra or bonus feature.

Also in various embodiments, the cameras 102 provides images for viewing on one or more displays 106 that are disposed inside the vehicle 100 (i.e. inside the body 110 of the vehicle 100). In various embodiments, the displays 106 may be located as part of a front dash, control panel, rear view mirror, and/or navigation system, and/or in one or more other locations inside the vehicle 100. In certain embodiments, the display 106 is also utilized by the control system 108 for displaying notices pertaining to the analysis of the tires 114.

In various embodiments, the control system 108 is disposed within the body 110 of the vehicle 100. In one embodiment, the control system 108 is mounted on the chassis 112. The control system 108 controls operation of the cameras 102, and utilizes images from the cameras 102 in analyzing the tires 114 (e.g., for wear and health of the tires 114). In various embodiments, the control system 108 also controls the displays 106, and provides notifications on the displays 106 pertaining to the analysis of the tires 114. In certain embodiments, the control system 108 may also provide other notifications pertaining to the tires 114, for example an audio notification and/or an electronic or other notification for a driver, owner, or operator of the vehicle 100. In various embodiments, the control system 108 provides these and other functions in accordance with steps of the processes 200, 400 described further below in connection with FIGS. 2-5. In certain embodiments, the control system 108 may be disposed outside the body 110, for example on a remote server, in the cloud, or in a remote smart phone or other device where image processing is performed remotely.

Also as depicted in FIG. 1, in various embodiments the control system 108 is coupled to the camera 102 via a communication link 109, and receives camera images from the camera 102 via the communication link 109. In certain embodiments, the communication link 109 comprises one or more wired connections, such as one or more cables (e.g. coaxial cables and/or one or more other types of cables), and/or one or more wireless connections (e.g. using wireless bus technology).

As depicted in FIG. 1, the control system 108 includes a sensor array 122 and a controller 126. Also as depicted in FIG. 1, in certain embodiments the control system 108 also includes a transceiver 124. In certain embodiments, the images from the camera 102 may be received by the control system 108 via one or more transceivers 124 and/or components thereof (e.g. a receiver).

The sensor array 122 includes one or more sensors for obtaining information for use by the control system 108, for example for analyzing the tires 114. Specifically, in various embodiments, the sensor array 122 includes the cameras 102 as well as one or more additional detection sensors 131 (e.g., radar, lidar, sonar), gear selection sensors 132 (e.g., for detecting a gear or transmission status of the vehicle 100, such as "park", "reverse", "drive", "neutral", and so on), speed sensors 133 (e.g., wheel speed sensors and/or accelerometers that are used for determining a speed of the vehicle 100); and steering angle sensors 134 (e.g., steering wheel angle sensors for determining an angle for steering of the vehicle 100). In various embodiments, the various sensors of the sensor array 122 are disposed on or within the vehicle 100. In certain embodiments, this sensing information (e.g., the sending information other than the camera 102 images) may be provided to the control system 108 from one or more other sources, such as a CAN bus on the vehicle 100, instead of directly coming from the sensor array 122.

The controller 126 processes and analyzes the images provided from the cameras 102 via the communication link 109 (and, in some embodiments, from the transceiver 124) as well as data provided by the sensors of the sensor array 122. The controller utilizes the images and data in analyzing the tires 114, for example pertaining to the wear and health of the tires 114. Also in various embodiments, the controller 126 controls other aspects of the display of images associated with the camera 102 on the one or more displays 106 of the vehicle 100 (e.g. by processing and cropping the images, and so on, and by providing notifications, such as on the display 106, pertaining to the analysis of the tires 114). In various embodiments, the controller 126 provides these and other functions in accordance with the steps discussed further below in connection with the schematic drawings of the vehicle 100 in FIG. 1 and the additional drawings of FIGS. 3-5 in connection with the processes 200, 400 discussed further below).

In one embodiment, the controller 126 is coupled to the camera 102, the displays 106, the sensor array 122, and the transceiver 124. Also in one embodiment, the controller 126 is disposed within the control system 108, within the vehicle 100. In certain embodiments, the controller 126 (and/or components thereof, such as the processor 142 and/or other components) may be part of the camera 102, disposed within the camera 102, and/or disposed proximate the camera 102. Also in certain embodiments, the controller 126 may be disposed in one or more other locations of the vehicle 100. In addition, in certain embodiments, multiple controllers 126 may be utilized (e.g. one controller 126 within the vehicle 100 and another controller within the camera 102), among other possible variations. In addition, in certain embodiments, the controller can be placed outside vehicle, such as in a remote server, in the cloud or on a remote smart device.

As depicted in FIG. 1, the controller 126 comprises a computer system. In certain embodiments, the controller 126 may also include one or more of the sensors of the sensor array 122, the transceiver 124 and/or components thereof, the camera 102 and/or components thereof, one or more displays 106 and/or components thereof, and/or one or more other devices and/or systems and/or components thereof. In addition, it will be appreciated that the controller 126 may otherwise differ from the embodiment depicted in FIG. 1. For example, the controller 126 may be coupled to or may otherwise utilize one or more remote computer systems and/or other control systems, for example as part of one or more of the above-identified vehicle 100 devices and systems.

In the depicted embodiment, the computer system of the controller 126 includes a processor 142, a memory 144, an interface 146, a storage device 148, and a bus 150. The processor 142 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 126 and the computer system of the controller 126, generally in executing the processes described herein, such as the processes 200, 400 described further below in connection with FIGS. 2-5.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 154 (e.g., known patterns and/or characteristics of tire tread, tire tracks, and/or other features pertaining to tires in different conditions and states of age, health, and repair).

The bus 150 serves to transmit programs, data, status and other information or signals between the various components of the computer system of the controller 126. The interface 146 allows communication to the computer system of the controller 126, for example from a system driver and/or another computer system, and can be implemented using any suitable method and apparatus. In one embodiment, the interface 146 obtains the various data from the sensors of the sensor array 122 and/or the transceiver 124. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including direct access storage devices such as hard disk drives, flash systems, floppy disk drives and optical disk drives. In one exemplary embodiment, the storage device 148 comprises a program product from which memory 144 can receive a program 152 that executes one or more embodiments of one or more processes of the present disclosure, such as the steps of the processes 200, 400 (and any sub-processes thereof) described further below in connection with FIGS. 2-5. In another exemplary embodiment, the program product may be directly stored in and/or otherwise accessed by the memory 144 and/or a disk (e.g., disk 156), such as that referenced below. In certain embodiments, the storage may also be provided remotely, for example through cloud storage, such as via a remote telematics, assistance, and/or other service.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 126 may also otherwise differ from the embodiment depicted in FIG. 1, for example in that the computer system of the controller 126 may be coupled to or may otherwise utilize one or more remote computer systems and/or other control systems.

Figure 2:
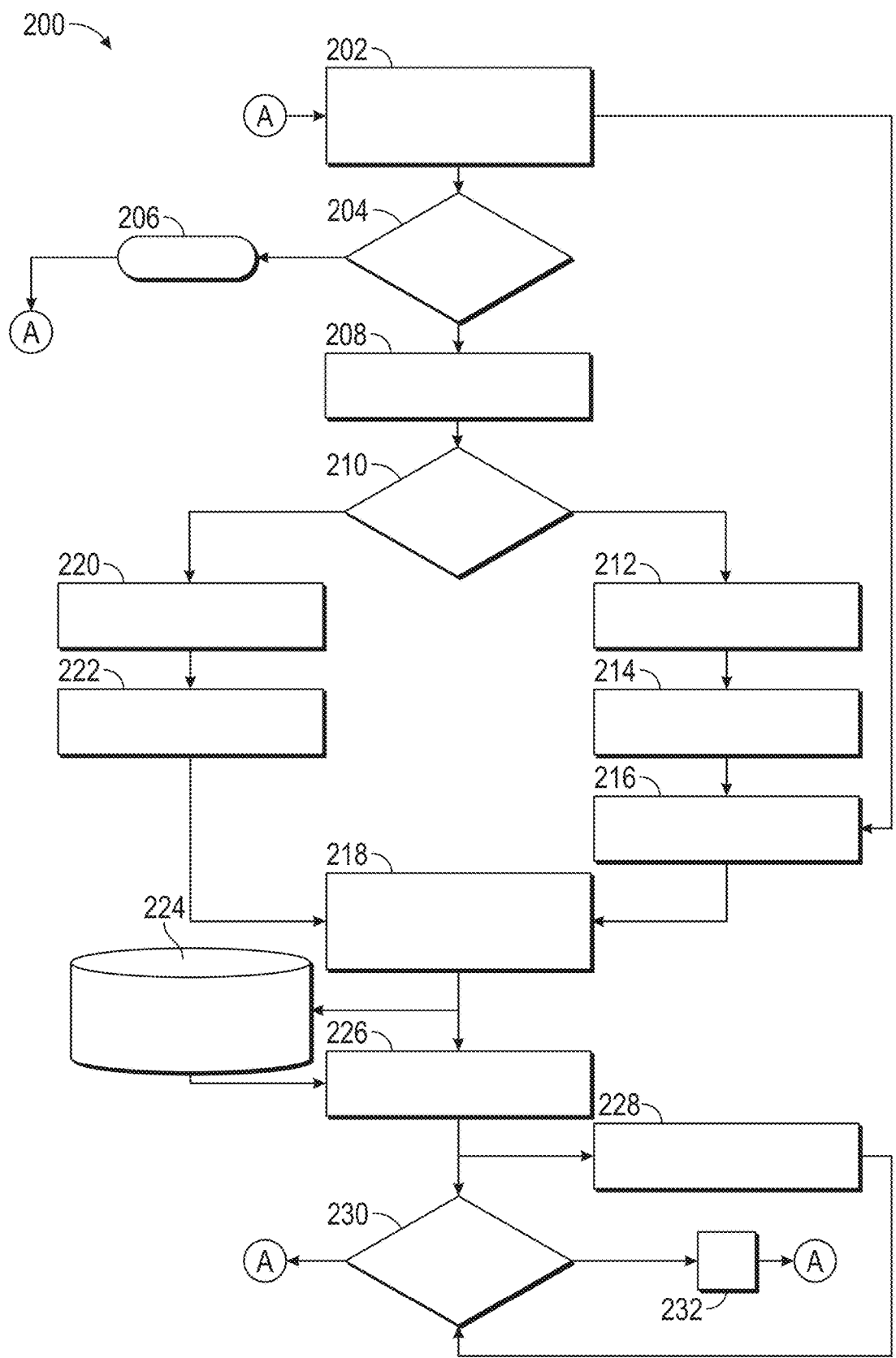
FIG. 2 is a flowchart of a first process for analyzing tires of a vehicle using camera images of the tires, and that can be implemented in connection with the vehicle, tires, cameras, and control system of FIG. 1, in accordance with an exemplary embodiment.

FIG. 2 is a flowchart of a process 200 for analyzing tires of a vehicle using camera images of the tires, in accordance with an exemplary embodiment. The process 200 can be implemented in connection with the vehicle 100, the tires 114, the cameras 102, and the control system 208 of FIG. 1, in accordance with an exemplary embodiment. In one embodiment, the process 200 begins when a vehicle drive or ignition cycle begins (for example when a driver approaches or enters the vehicle, or when the driver turns on the vehicle and/or an ignition therefor, e.g., by turning a key, engaging a keyfob or start button, and so on), and continues throughout the duration of the vehicle drive or ignition cycle. The process 200 is also discussed below in connection with FIG. 3, which provides illustrations for exemplary comparisons of tires 114 of the vehicle 100 in accordance with the process 200, in accordance with an exemplary embodiment.

As depicted in FIG. 2, in one embodiment, data is obtained a 202. In certain embodiments, the data is obtained via a message along a communication link, such as the communication link 109 of FIG. 1, and/or via a CAN bus. In certain embodiments, the data may be obtained from any number of sources, for example via the transceiver 124 of FIG. 1. In various embodiments, the data includes various data pertaining to operation of the vehicle 100, such as a steering angle, a wheel speed, and so on, for example as obtained via respective sensors of the sensor array 122 of FIG. 1. In various embodiments, various other different types of vehicle sensor data may also be obtained at 202, such as pertaining to a steering wheel, wheel 101 alignment, possible misalignment, and so on.

A determination is made at 204 as to whether the vehicle 100 is performing a low speed, sharp turn. In various embodiments, this determination comprises a determination by the processor 142 of FIG. 1 as to whether the vehicle 100 is making a turn at a turn angle that is greater than a first threshold (a steering angle threshold) while travelling at a speed that is less than a second threshold (a speed threshold), based on the data obtained at 202 (e.g., from the steering angle sensors 134 and the speed sensors 133 of FIG. 1). In certain embodiments, the first threshold (steering angle) is a turning angle that beyond this angle, full or most (e.g. ¾) tire tread width is exposed in the camera field of view (FOV) so that we can analyze the tire tread pattern at whole tread width. Also in certain embodiments, the second threshold (speed threshold) is a speed value (e.g., 5 MPH), such that the vehicle 100 must be below this speed in order to obtain a clear image of the tire tread. Otherwise at higher speed, we may get a blur (motion blur) image because of the fast moving tire.

If it is determined at 204 that the vehicle 100 is not performing at low speed, sharp turn, then at 206 the camera images are not utilized with respect to the tires. In certain embodiments, the camera images are discarded or not recorded, via instructions provided by the processor 142 of FIG. 1. In certain embodiments, camera images may be provided on the display 106 inside the vehicle 100 for a user of the vehicle 100 in certain situations (e.g., as part of a back-up camera system or other system, and so on). However, in various embodiments, camera images are not utilized for analysis of the tires 114 at 206. Also in various embodiments, the process 200 returns to 202 following 206.

Conversely, if it is determined at 204 that the vehicle 100 is performing a low speed, sharp turn, then at 208 camera images are obtained from one or more cameras 102 of FIG. 1. In various embodiments, camera images from side cameras 102 of the vehicle 100 (e.g., mounted on or near the side mirrors 105 of FIG. 1) are provided to the processor 142 of FIG. 1, in accordance with instructions provided by the processor 142.

In certain embodiments, for each respective side camera 102, a determination is made as to whether the respective side camera 102 is on the turning side of the vehicle 100. For example, in one embodiment, a side camera 102 on the left side of the vehicle 100 (e.g., the driver side of the vehicle 100, for a vehicle 100 in the United States) is considered to be on the turning side of the vehicle 100 when the vehicle is turning left if image processing is performed on a sidewall of the tire 114 (for tread detection for the tire 114, the turning side for the camera 102 is the opposite, in one embodiment). Similarly, also in one embodiment, a side camera 102 on the right side of the vehicle 100 (e.g., the passenger side of the vehicle 100, for a vehicle 100 in the United States) is considered to be on the turning side of the vehicle 100 when the vehicle is turning right if image processing is performed on a sidewall of the tire 114 (for tread detection for the tire 114, the turning side for the camera 102 is the opposite, in one embodiment). Also in one embodiment, this determination is made by the processor 142 of FIG. 1.

For each respective side camera 102, if it is determined at 210 that the respective side camera 102 is on the turning side (e.g., that the respective side camera 102 is a "turning side camera"), then pre-processing is provided at 212 for the images of each respective turning side camera. In certain embodiments, during 212, the processor 142 provides smoothing for the camera images. Also in certain embodiments, the pre-processing also includes image distortion correction (e.g., surround view cameras are often fisheye cameras that may have distortion) and image enhancement, among other possible pre-processing steps).

In addition, at 214, camera images from the respective turning side camera are provided for the side-wall of a respective tire 114 in view of the respective turning side camera (e.g., in one embodiment, a front tire 114 on the same side of the vehicle 100 as the respective turning side camera), and feature points detection is provided via the respective turning side camera and the processor 142. In certain embodiments, this part is to utilize, e.g. feature points detection and matching, to determining which portion/location of the tire tread or side-wall we are viewing in current frame.

Also in certain embodiments, an estimation of an angle is made at 216 at which the respective tire 114 has revolved. In various embodiments, the estimation of the angle at 216 is made by the processor 142 based on data of 202 provided via the steering angle sensors 134. The images, data, and information of 212-216 are then utilized for tire pattern analysis at 218, described further below.

With reference again to 202, for each respective side camera 102, if it is determined at 210 that the respective side camera 102 is not on the turning side (e.g., that the camera 102 is an "opposite side camera"), then pre-processing is provided at 220 for the images of each respective opposite side camera. In certain embodiments, during 220, the processor 142 provides smoothing for the camera images as well as preparation for use of a gradient and histogram of values for the camera images. In addition, in certain embodiments, image enhancement is provided, such as histogram equalization, for the camera images. In addition, at 222, camera images from the respective opposite side camera are provided for the tread of a respective tire 114 in view of the respective opposite side camera (e.g., in one embodiment, a front tire 114 on the same side of the vehicle 100 as the respective opposite side camera), and image analysis is provided with respect to the image and the tire tread from the image. In various embodiments, the image analysis is performed by the processor 142. The images, data, and information of 220 and 222 are then utilized for tire pattern analysis at 218, described below.

The various images, data, and information of 212-216, 220, and 222 are utilized for tire analysis at 218. Specifically, in various embodiments, tread patterns analysis and sidewall pattern analysis are provided for the tires 114. In certain embodiments, the processor 142 performs sidewall pattern analysis for each respective tire 114, resulting in a first sidewall pattern for the respective tire 114, based on the images, data, and information of 212-216 based on the images obtained via the turning side cameras. Also in certain embodiments, the processor 142 performs tire tread pattern analysis for each respective tire 114, resulting in a first tread pattern for the respective tire 114, based on the images, data, and information of 220 and 222 based on the images obtained via the opposite side cameras. In certain embodiments, the first sidewall patterns and the first tread patterns for the respective tires 114 are generated using a histogram of oriented gradient (HoG) values. In other embodiments, the first sidewall patterns and the first tread patterns for the respective tires 114 are generated using machine learning or deep learning through a convolutional neural network model, and/or via one or more other techniques. In certain embodiments, other types of sensor data are utilized in connection with the tire analysis, such as analysis pertaining to a steering wheel, wheel 101 alignment, possible misalignment, and so on (e.g., utilizing data pertaining to the steering wheel while the vehicle 100 is driven on a straight road)—for example, in certain embodiments, detection of vehicle health issues utilizing such vehicle sensor data can be utilized in prioritizing which image processing algorithms are run and/or which image processing algorithms may be provided greater weight, and so on (e.g., given that misalignment may cause specific tread patterns, and so on).

A historical database of tread patterns and sidewall patterns is utilized at 224. Specifically, in certain embodiments, the first tread pattern of 218 is compared with one or more known tread patterns (e.g., second tread patterns) from self or other tires with a known age and health (e.g., new tires, or tires of other known ages, mileage, wear, inflation, health, and so on, in various embodiments) from the historical database. Also in certain embodiments, the first sidewall pattern of 218 is compared with one or more known sidewall patterns (e.g., second sidewall patterns) from self or other tires with a known age and health (e.g., new tires, as well as tires at other predefined states in terms of age, usage, and health, in certain embodiments) from the historical database. In certain embodiments, the processor 142 provides the comparisons of 224, and also updates the historical database to include the first tread pattern and the first sidewall pattern of 218 from the vehicle 100 to update the historical database to include this information. In certain embodiments, the historical database may reside on the vehicle 100, for example as part of the stored values 154 of the memory 144 of FIG. 1. In other embodiments, the historical database may be stored remotely from the vehicle 100, for example via a remote server, and the control system 108 may communicate with the remote server via the transceiver 124, for example via one or more wireless networks. In addition, in certain embodiments, vehicle motion and measurements may be used to pre-identify the type of problem, e.g., if the vehicle pulls to the left or right indicating misalignment, and so on.

Determinations are made with respect to the tires at 226. Specifically, in certain embodiments, the processor 142 makes determinations as to a wear and tear of the tires 114 of the vehicle 100 of FIG. 1 based on a comparison of the first tread pattern and first sidewall pattern of 218 with respective tread patterns and sidewall patterns of the historical database, for a determination of the wear and tear of the tires, and/or for other measures of health of the tires (e.g., inflation, alignment, punctures or other imperfections, and so on).

Figure 3:
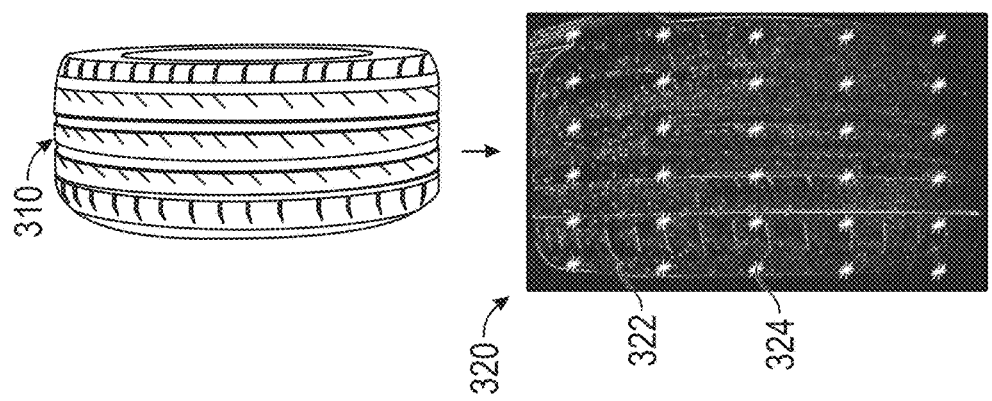
FIG. 3 provides illustrations for exemplary comparisons of tires of a vehicle in accordance with the process of FIG. 2, in accordance with an exemplary embodiment.
Figure 3:
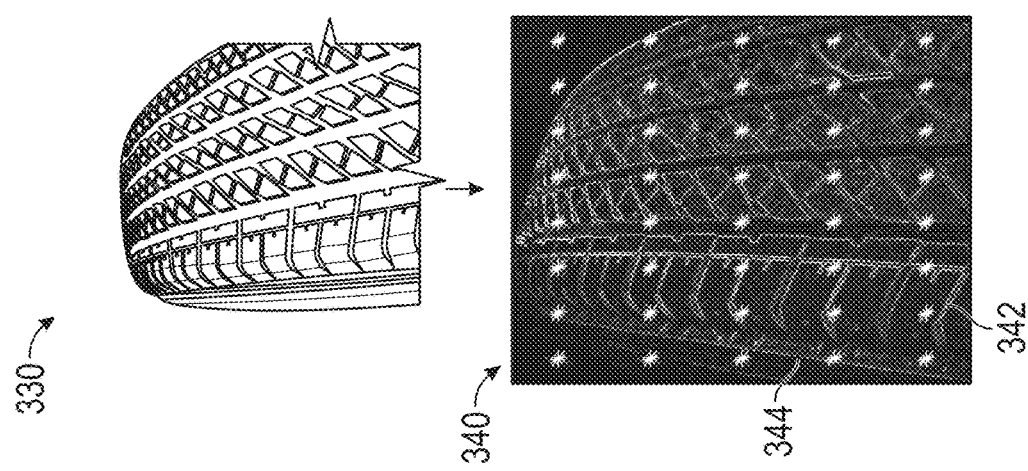

By way of example, FIG. 3 shows illustrative tread patterns for respective tires, in accordance with an exemplary embodiment. As depicted in FIG. 3, a first tire 310 represents a worn tire, with a corresponding first tread image 320. The first tread image 320 shows tread markings 322 and histogram of oriented gradient (HoG) values at different regions 324 with respect to a worn tire. In one embodiment, the first tire 310 represents one or more of the tires 114 of the vehicle 100 of FIG. 1, with an associated first tread pattern of 218.

Also as depicted in FIG. 3, a second tire 330 represents a new tire, with a corresponding second tread image 340. The second tread image 340 shows tread markings 342 and regions 344 pertaining to HoG values with respect to a new tire. In one embodiment, the second tire 330 represents one or more of the tires with patterns associated with the historical database of 224.

With reference again to FIG. 2, in certain embodiments, the processor 142, at 226, compares the first tread pattern of 218 (e.g., corresponding to the first tread image 320 of FIG. 3) with a known tread pattern of 224 from the historical database (e.g., corresponding to the second tread image 340 of FIG. 3). In various embodiments, values of wear and tear (and/or other tire health values, as noted above) can be ascertained via a comparison between the first tread pattern of 218 with the known, new tire tread pattern from the historical database (and/or with other known tread patterns of the historical database, for example corresponding to other known levels of wear and/or health, such as age, inflation, and/or mileage), for example via gradient/histogram of values comparisons, deep learning using neural network models, and so on. Also in various embodiments, values of wear and tear, and/or other health values, may similarly be ascertained via comparing the first sidewall patterns of 218 with known sidewall patterns (e.g., pertaining to new tires, and/or to other tires having other known age, mileage, wear, and/or other health values) of the historical database. In addition, in certain embodiments, such values (e.g., of wear and tear, and/or other health values) may also be compared to the logged historical values of the same tire (or other tires in front/rear axle of the vehicle) when it was rather new.

In addition, in certain embodiments, further diagnosis is performed at 228 based on the analyzed tire wear/tear information of 226. For example, in certain embodiments, the processor 142 diagnoses possible issues pertaining to the tires, such as possible wear, inflation, misalignment, punctures, other imperfections, and so on. Also in certain embodiments, the processor 142 diagnoses possible issues with respect to other vehicle systems that could cause and/or be affected by any tire issues, such as the suspension system or wheel 101 misalignment of the vehicle 100, and so on. In certain embodiments, other types of sensor data are utilized in connection with the tire analysis, such as analysis pertaining to a steering wheel, wheel 101 alignment, possible misalignment, and so on (e.g., utilizing data pertaining to the steering wheel while the vehicle 100 is driven on a straight road)—for example, in correlating detection of such vehicle health issues as part of the further diagnosis.

A determination is made at 230 as to whether a warning, notification, or other action is warranted. In certain embodiments, the processor 142 determines, based on the information of 226 and 228, whether such warning, notification, or other action may be appropriate based on a severity of any tire or other vehicle system issues, and/or as to whether any remedial action may be appropriate (e.g., such as inflating the tires, rotating the tires, changing the tires, wheel 101 alignment, and so on). It is noted that in certain embodiments and in certain vehicles a pressure monitor may also provide a warning for inflation of the tires, but not necessarily for the other issues.

If it is determined at 230 that such a warning, notification, or other action is warranted, then such warning, notification, or action is provided at 232. In certain embodiments, one or more notifications or warnings are provided at 232 via instructions provided by the processor 142. In certain embodiments, an audio notification is provided within the vehicle 100. Also in certain embodiments, a visual notification is provided, for example via a display 106 of FIG. 1 inside the vehicle 100 (e.g., on a vehicle dash board, control panel, navigation system, rear view mirror, or the like). In addition, in certain embodiments, an electronic notification may be provided to an owner, operator, or user of the vehicle 100, for example via an e-mail, text message, or the like. In certain embodiments, the process then returns to 202.

Conversely, if it is determined at 230 that such a warning, notification, or other action is not warranted, then the process returns to 202, without providing a warning, notification, or action.

Figure 4:
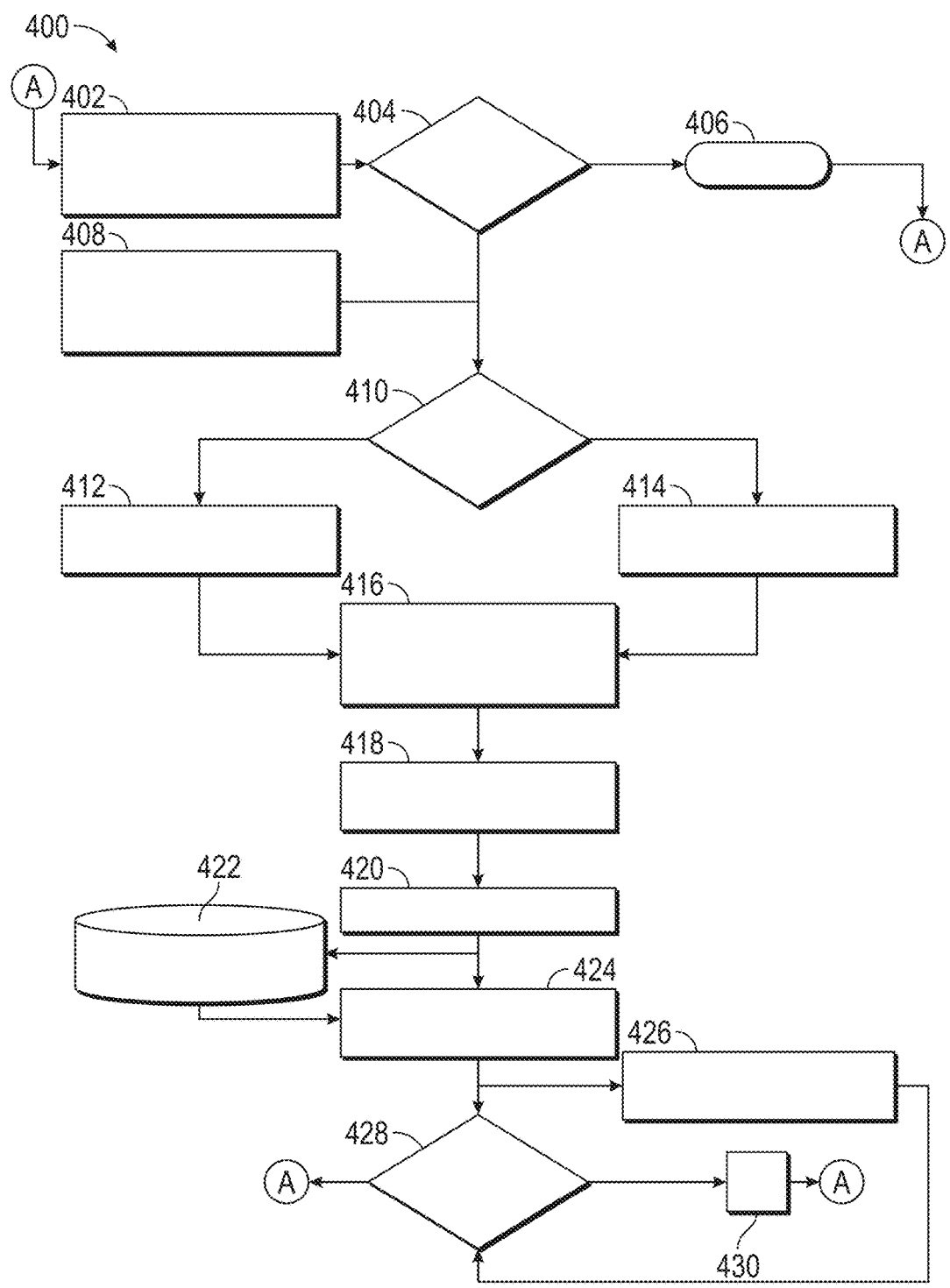
FIG. 4 is a flowchart of a second process for analyzing tires of a vehicle using camera images of tracks from the tires, and that can be implemented in connection with the vehicle, tires, cameras, and control system of FIG. 1, in accordance with an exemplary embodiment.

FIG. 4 is a flowchart of a process 400 for analyzing tires of a vehicle using camera images of tracks of the tires, in accordance with an exemplary embodiment. The process 400 can be implemented in connection with the vehicle 100, the tires 114, the cameras 102, and the control system 208 of FIG. 1, in accordance with an exemplary embodiment. In one embodiment, the process 400 begins when a vehicle drive or ignition cycle begins (for example when a driver approaches or enters the vehicle, or when the driver turns on the vehicle and/or an ignition therefor, e.g., by turning a key, engaging a key fob or start button, and so on), and continues throughout the duration of the vehicle drive or ignition cycle. The process 400 is also discussed below in connection with FIG. 5, which provides illustrations for exemplary comparisons of tires 114 of the vehicle 100 in accordance with the process 400, in accordance with an exemplary embodiment.

As depicted in FIG. 4, in one embodiment, first data is obtained at 402. In certain embodiments, the first data comprises data pertaining to a surface and condition of a path or road (collectively referred to herein as a road, for brevity) is obtained. In certain embodiments, the first data is obtained from one or more of the cameras 102 of FIG. 1, for example via the communication link 109 of FIG. 1. In certain embodiments, the first data may also be obtained via one or more remote sources, for example from a weather service, such as a weather service report received via the transceiver 124 of FIG. 1. Also, the road type can be obtained from map information, e.g., dirt road, gravel road, etc.

A determination is made at 404 as to a condition of the road. In various embodiments, the condition of the road is determined by the processor 142 of FIG. 1 using the first data of 402. Also in certain embodiments, the condition of the road comprises whether a surface of the road is dry, versus whether the surface of the road is wet, or represents coverage by snow, sand, mud, or the like.

If it is determined at 404 that the road condition is dry then at 406 the camera images, used to detect tire tracks, are not utilized with respect to the tires. In certain embodiments, the camera images are discarded or not recorded, via instructions provided by the processor 142 of FIG. 1. In certain embodiments, camera images may be provided on the display 106 inside the vehicle 100 for a user of the vehicle 100 in certain situations (e.g., as part of a back-up camera system or other system, and so on). However, in various embodiments, camera images are not utilized for analysis of the tires 114 at 406. Also in various embodiments, the process 400 returns to 402 following 406. In certain embodiments, the second method works best when the road is not dry, so that the tire 114 can leave a tire print (or "footprint") on the surface (e.g., on fresh snow, sand, or mud).

Conversely, if it is determined at 404 that the road condition is not dry (and, for example, has a surface covered with snow, sand, mud, or the like), then the process continues at 410, described further below.

In addition, in certain embodiments, second data is obtained at 408. In various embodiments, the second data of 408 includes data as to operation of the vehicle 100, such as a selected gear or transmission state (e.g., drive, park, reverse, neutral), a steering angle, a wheel speed and/or vehicle speed, and so on, for example as obtained via respective sensors of the sensor array 122 of FIG. 1.

A determination is made at 410 as to whether the vehicle 100 is in a reverse gear. In certain embodiments, this determination is made by the processor 142 of FIG. 1 using the second data of 408 (e.g., the selected gear, as detected via the gear selection sensor 132 of FIG. 1).

If it is determined that the vehicle 100 is in reverse, then camera images are obtained at 412 of tire tracks from one or more front cameras 102 of the vehicle 100. Specifically, in certain embodiments, cameras 102 on or near the front of the vehicle 100 (e.g., the front fascia 103 of FIG. 1) are utilized to generate images of tire tracks in front of the vehicle 100, for example made by front tires 114 of the vehicle 100. In certain embodiments, other data from the second data of 408 are utilized, in accordance with instructions provided by the processor 142, for identifying the tire tracks of the vehicle 100 (e.g., in one embodiment, a steering angle is utilized in identifying a location of the tire tracks, and so on). The process then proceeds to 416, discussed further below.

Conversely, if it is determined that the vehicle 100 is in a forward driving mode or is in a stop from previous driving (e.g., such that the vehicle 100 is not in reverse, and/or that the vehicle 100 is travelling forward and/or stopped from previous driving), then camera images are obtained at 414 of tire tracks from one or more rear cameras 102 of the vehicle 100. Specifically, in certain embodiments, cameras 102 on or near the rear of the vehicle 100 (e.g., the rear portion of the body 110 of FIG. 1) are utilized to generate images of tire tracks behind the vehicle 100, for example made by rear tires 114 of the vehicle 100. In certain embodiments, other data from the second data of 408 are utilized, in accordance with instructions provided by the processor 142, for identifying the tire tracks of the vehicle 100 (e.g., in one embodiment, a steering angle is utilized in identifying a location of the tire tracks, and so on). The process then proceeds to 416, discussed below.

The images of 412 and 414 are pre-processed at 416. In certain embodiments, during 416, the processor 142 provides smoothing, de-warping, transformation, and cropping for the camera images with respect to a region of interest for the tire tracks on the images.

In addition, at 418, image analysis is provided at 222 for the camera images of the tire tracks. In various embodiments, the image analysis is provided with respect to the images of the tire treads, and is performed by the processor 142.

The various images, data, information, and analysis results of 412-420 are utilized for tire pattern analysis at 420. Specifically, in various embodiments, tread patterns analysis is provided for the tires 114. In certain embodiments, the processor 142 performs tire tread pattern analysis for each respective tire 114, resulting in a first tread pattern for the respective tire 114, based on the images, data, information, and data analysis of 412-420 based on the images obtained via the front and rear cameras 102 with respect to the tire tracks. In certain embodiments, the first tread patterns for the respective tires 114 are generated using a histogram of oriented gradient values. In other embodiments, the first tread patterns for the respective tires 114 are generated using machine learning, or using deep learning with a neural network model, and/or via one or more other techniques.

A historical database of tread patterns and sidewall patterns is utilized at 422. Specifically, in certain embodiments, the first tread pattern of 420 is compared with one or more known tread patterns (e.g., second tread patterns), for example from a historical image/data of the this same tire 114 when it was new, and/or from one or more other tires with a known age and health (e.g., new tires, or tires having other known values of age, mileage, wear, health, inflation, and so on, in various embodiments) from the historical database. In certain embodiments, the processor 142 provides the comparisons of 422, and also updates the historical database to include the first tread pattern of 420 from the vehicle 100 to update the historical database to include this information. In certain embodiments, the historical database may reside on the vehicle 100, for example as part of the stored values 154 of the memory 144 of FIG. 1. In other embodiments, the historical database may be stored remote from the vehicle 100, for example via a remote server, and the control system 108 may communicate with the remote server via the transceiver 124, for example via one or more wireless networks.

Determinations are made with respect to the tires at 424. Specifically, in certain embodiments, the processor 142 makes determinations as to a wear and tear of the tires 114 of the vehicle 100 of FIG. 1 based on a comparison of the first tread pattern of 420 with one or more tread patterns of the historical database, for a determination of the wear and tear of the tires, and/or for other measures of health of the tires (e.g., inflation, alignment, punctures or other imperfections, and so on).

Figure 5:
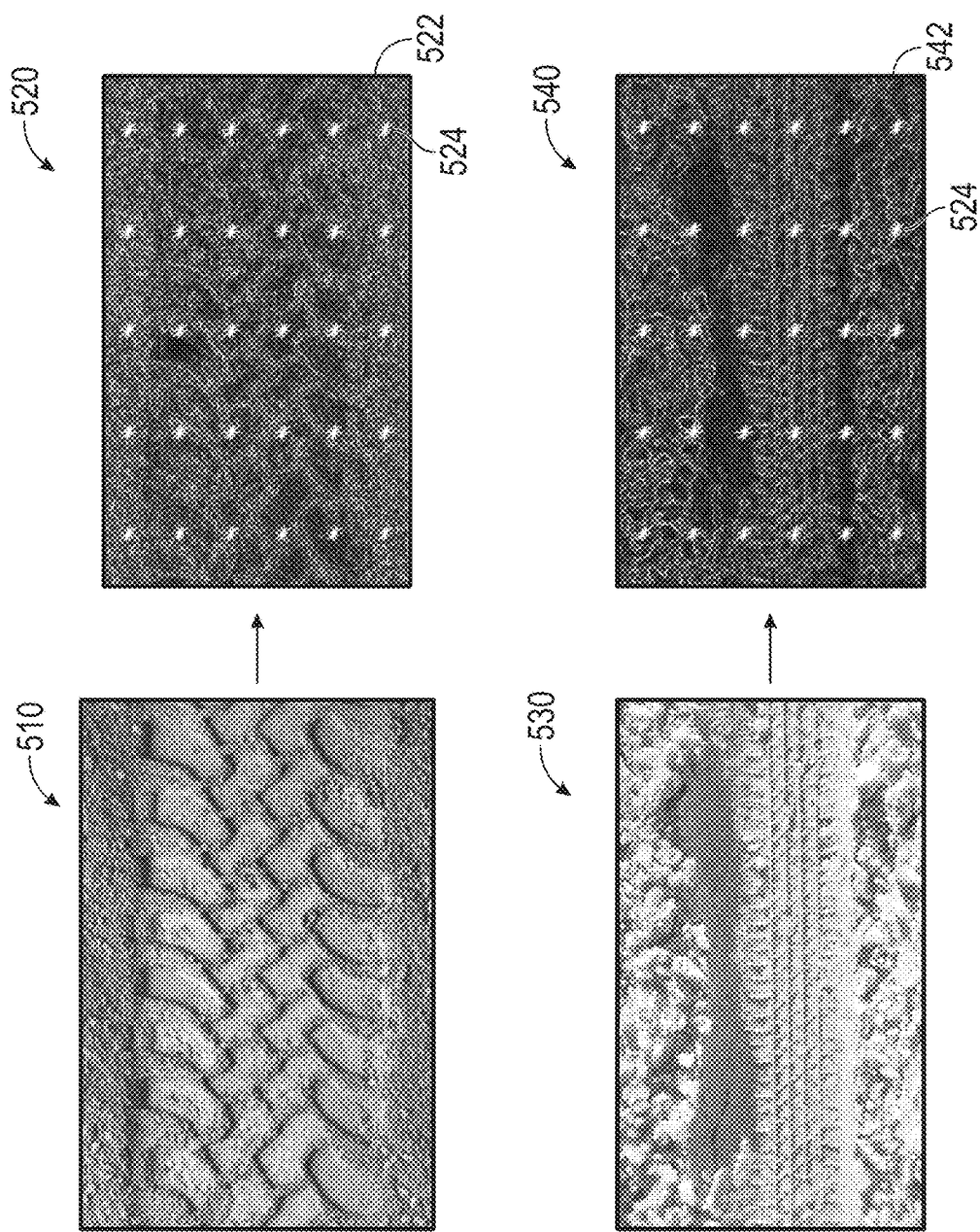
FIG. 5 provides illustrations for exemplary comparisons of tires of a vehicle in accordance with the process of FIG. 4, in accordance with an exemplary embodiment.

By way of example, FIG. 5 shows illustrative tread patterns for respective tires, in accordance with an exemplary embodiment. As depicted in FIG. 5, a first tire 510 has a first tread image 520, with tread markings 522 and a histogram of oriented gradient (HoG) 524 with respect to the first tire 510. Also as depicted in FIG. 5, a second tire 530 has a second tread image 540, with tread markings 542 and HoG 544 with respect to a histogram of oriented gradient with respect to the second tire 540. In accordance with certain embodiments, this provides one example that shows two comparing tires (one new, the other partially worn on inner side) have different tread patterns and different corresponding HoG values at worn regions and non-worn regions.

With reference again to FIG. 2, in certain embodiments, the processor 142, at 424, compares the first tread pattern of 420 with one or more known tread patterns of 422 from the historical database. In various embodiments, values of wear and tear (and/or other tire health values, as noted above) can be ascertained via a comparison between the first tread pattern of 420 with a known, new tire tread pattern (or a tire in good condition) from the historical database (and/or with other known tread patterns of the historical database, for example corresponding to other known levels of wear and/or health, such as age and/or mileage), for example via HoG values comparisons, machine learning, or deep learning using neural network models, and so on.

In addition, in certain embodiments, other diagnosis is performed at 426 based on the tire information of 424. For example, in certain embodiments, the processor 142 diagnoses possible issues pertaining to the tires, such as possible wear, inflation, misalignment, punctures, other imperfections, and so on. Also in certain embodiments, the processor 142 diagnoses possible issues with respect to other vehicle systems that could cause and/or be affected by any tire issues, such as the suspension system or wheel 101 misalignment of the vehicle 100, and so on.

A determination is made at 428 as to whether a warning, notification, or other action is warranted. In certain embodiments, the processor 142 determines, based on the information of 424 and 426, whether such warning, notification, or other action may be appropriate based on a severity of any tire or other vehicle system issues, and/or as to whether any remedial action may be appropriate (e.g., such as inflating the tires, rotating the tires, changing the tires, and so on).

If it is determined at 428 that such a warning, notification, or other action is warranted, then such warning, notification, or action is provided at 430. In certain embodiments, one or more notifications or warnings are provided at 430 via instructions provided by the processor 142. In certain embodiments, an audio notification is provided within the vehicle 100. Also in certain embodiments, a visual notification is provided, for example via a display 106 of FIG. 1 inside the vehicle 100 (e.g., on a vehicle dash board, control panel, navigation system, rear view mirror, or the like). In addition, in certain embodiments, an electronic notification may be provided to an owner, operator, or user of the vehicle 100, for example via an e-mail, text message, or the like. In certain embodiments, the process then returns to 202.

Conversely, if it is determined at 428 that such a warning, notification, or other action is not warranted, then the process returns to 402, without providing a warning, notification, or action.

Accordingly, methods, systems, and vehicles are provided for analysis of tires of a vehicle based on images obtained from vehicle-mounted cameras while the vehicle is in operation. In certain embodiments, certain cameras (e.g., side-mounted cameras) generate images of the tires (e.g., of the tread and sidewalls of the tires) for use by a processor in analyzing the tire (e.g., by comparing a tread pattern and sidewall pattern of the tire with known patterns in a historical database). In certain other embodiments, certain other cameras (e.g., front-mounted and rear-mounted cameras) generate images of tracks made by the tires (e.g., including images of the tread of the tires, as represented in the tracks) for use by a processor in analyzing the tire (e.g., by comparing a tread pattern from the tracks with known patterns in the historical database).

It will be appreciated that the systems, vehicles, and methods may vary from those depicted in the Figures and described herein. For example, the vehicle 100, the cameras 102, the displays 106, the control system 108, the tires 114, and/or various components thereof may vary from that depicted in FIGS. 1-5 and described in connection therewith, in various embodiments. It will similarly be appreciated that the steps of the processes 200, 400 may differ from those depicted in FIGS. 2-5, and/or that various steps of the process 200, 400 may occur concurrently and/or in a different order than that depicted in FIGS. 2-5, in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining camera images of one or more tires of a vehicle, utilizing one or more cameras, during operation of the vehicle;
   processing the camera images, via a processor, in order to generate an analysis of one or more of the tires based on the images that were obtained via the one or more cameras that are mounted on the vehicle;
   determining, using data provided by one or more sensors, a speed of the vehicle; and
   determining, using data provided by the one or more sensors, a turn angle of a turn of the vehicle;
   wherein the obtaining of the camera images comprises obtaining the camera images when the turn angle is greater than a first predetermined threshold and the speed is less than a second predetermined threshold.

2. The method of claim 1, wherein the obtaining of the camera images comprises obtaining camera images of the one or more tires from one or more side cameras that are mounted on one or more sides of the vehicle, when the vehicle is making a turn.

3. The method of claim 2, wherein the obtaining of the camera images comprises:
   obtaining first images of a tread of a respective tire from a first respective camera that is on a first side of the vehicle, during the turn; and
   obtaining second images of a sidewall of the respective tire from a second respective camera that is on a second side of the vehicle, opposite the first side, during the turn.

4. The method of claim 1, wherein the processing of the camera images comprises:
   determining a first tread pattern of a respective tire based on the camera images; and
   comparing the first tread pattern with one or more known second tread patterns from a historical database of a different tire, or the vehicles tires when rather new, having a known amount of wear.

5. The method of claim 4, wherein the determining of the first tread pattern comprises determining the first tread pattern using a histogram of oriented gradient (HoG) values.

6. The method of claim 4, wherein the determining of the first tread pattern comprises determining the first tread pattern using a machine learning method or a deep learning neural network model.

7. The method of claim 4, further comprising:
   updating the historical database using the first tread pattern.

8. The method of claim 1, wherein the processing of the camera images comprises:
   determining a first sidewall pattern of a respective tire based on the camera images; and
   comparing the first sidewall pattern with one or more known sidewall patterns of a different tire having a known amount of wear.

9. The method of claim 1, further comprising:
   determining whether a warning is appropriate based on the analysis of the tire; and
   providing the warning, via instructions provided by the processor, when it is determined that the warning is appropriate.

10. The method of claim 1, further comprising:
    obtaining additional sensor data pertaining to a wheel of the vehicle;
    wherein the processing of processing of the camera images further comprises processing the camera images using the additional sensor data pertaining to the wheel of the vehicle, via the processor, in order to facilitate the analysis of the one or more of the tires based on the images that were obtained via the one or more cameras that are mounted on the vehicle.

11. A method comprising:
    obtaining camera images of tracks made by one or more tires of a vehicle, utilizing one or more cameras that are mounted on the vehicle, during operation of the vehicle; and
    processing the camera images of the tracks, via a processor, in order to generate an analysis of one or more of the tires based on the images that were obtained via the one or more cameras that are mounted on the vehicle;
    wherein the processing of the camera images of the tracks comprises, via a processor:
       determining a first tread pattern of a respective tire based on the tracks made by the one or more tires, using the camera images of the tracks; and
       comparing the first tread pattern with one or more known second tread patterns of a different tire having a known amount of wear.

12. The method of claim 11, wherein the obtaining of the camera images comprises obtaining camera images of the tracks from a rear camera when the vehicle is driving forward.

13. The method of claim 11, wherein the obtaining of the camera images comprises obtaining camera images of the tracks from a front camera when the vehicle is driving in reverse.

14. The method of claim 11, further comprising:
    determining, using data provided by one or more sensors or map data, a condition of a road or type of the road on which the vehicle is travelling;
    wherein the camera images are obtained and processed when the condition represents not a dry road, but when the condition represents a wet, snowy, sandy, or muddy road.

15. The method of claim 11, wherein the determining of the first tread pattern comprises determining the first tread pattern using a histogram of oriented gradient (HoG) values.

16. The method of claim 11, wherein the determining of the first tread pattern comprises determining the first tread pattern using a neural network model machine learning method or a deep learning neural network model.

17. The method of claim 11, further comprising:
    obtaining additional sensor data pertaining to a wheel of the vehicle;
    wherein the processing of processing of the camera images further comprises processing the camera images using the additional sensor data pertaining to the wheel of the vehicle, via the processor, in order to facilitate the analysis of the one or more of the tires based on the images that were obtained via the one or more cameras that are mounted on the vehicle.

18. A vehicle comprising:
    one or more tires;
    one or more cameras onboard the vehicle, the one or cameras mounted on the vehicle as part of the vehicle, or low on an infrastructure, as part of the vehicle, the one or more cameras configured to generate camera images of tracks made by one or more of the tires; and a processor onboard the vehicle and configured to process the camera images in order to generate an analysis of one or more of the tires based on the images that were obtained via the one or more cameras that are mounted on the vehicle, wherein the processor is configured to generate the analysis by:

determining a first tread pattern of a respective tire based on the tracks made by the one or more tires, using the camera images of the tracks; and comparing the first tread pattern with one or more known second tread patterns of a different tire having a known amount of wear.

\* \* \* \* \*